(12) United States Patent
Yang

(10) Patent No.: US 7,968,795 B2
(45) Date of Patent: Jun. 28, 2011

(54) FACEPLATE AND ELECTRONIC DEVICE USING SAME

(75) Inventor: Wen-Yan Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 369 days.

(21) Appl. No.: 12/238,416

(22) Filed: Sep. 25, 2008

(65) Prior Publication Data

US 2009/0314508 A1  Dec. 24, 2009

(30) Foreign Application Priority Data

Jun. 20, 2008  (CN) .......................... 2008 1 0302254

(51) Int. Cl.
*H02G 3/14* (2006.01)
*H05K 5/03* (2006.01)
(52) U.S. Cl. ............ 174/67; 174/66; 220/241; 220/242; 361/679.02; 312/223.2
(58) Field of Classification Search ............... 174/66, 174/67, 59, 50, 58; 220/241, 242; 439/536; 312/223.1, 223.2, 223.6; 361/679.01, 679.02, 361/679.6; 200/5 A, 5 R, 341
See application file for complete search history.

(56) References Cited

U.S. PATENT DOCUMENTS

| | | | | |
|---|---|---|---|---|
| 5,863,016 A | * | 1/1999 | Makwinski et al. | 174/58 |
| 6,667,447 B2 | * | 12/2003 | Liu et al. | 200/5 R |
| 7,151,237 B2 | * | 12/2006 | Mahoney et al. | 200/5 A |
| 7,355,136 B2 | * | 4/2008 | Chen et al. | 200/341 |
| 7,538,271 B2 | * | 5/2009 | O'Young et al. | 174/66 |
| 7,722,137 B2 | * | 5/2010 | Li et al. | 361/679.6 |
| 7,795,534 B2 | * | 9/2010 | Lin et al. | 174/66 |

* cited by examiner

*Primary Examiner* — Angel R Estrada
(74) *Attorney, Agent, or Firm* — Frank R. Niranjan

(57) ABSTRACT

An exemplary faceplate comprises a panel, a guiding ring and two hooks. The panel includes an inner surface and an opposite outer surface, on which a number of passageways are defined running through the inner and outer surface. The guiding ring is mounted on the inner surface of the panel around a corresponding passageway of the panel. The guiding ring defines a housing room therein that is aligned with and communicates with the corresponding passageway of the panel. Two hooks are separately mounted on the inner surface of the panel and being respectively adjacent to the guiding ring, and each hook includes a clasp formed on an end thereof and the clasp protrudes beyond the guiding ring. The height of the each hook with respect to the inner surface of the panel is higher than that of the adjacent guiding ring with respect to the inner surface.

12 Claims, 5 Drawing Sheets

FACEPLATE AND ELECTRONIC DEVICE USING SAME

BACKGROUND

1. Technical Field

The present invention relates to faceplates, and particularly, to a faceplate being used with an electronic device.

2. Description of the Related Art

Most electronic products have a plurality of I/O connectors employed for transmitting video signals, audio signals, charging or for other purposes. Invariably, the connectors are integrated with and mounted to a main or mother board of the electronic products, as a result, a faceplate is adopted to identify and protect the connectors on the main board so that users can easily connect peripherals to the main board. However, most faceplates are mounted on the main board of the electronic product by screws or threaded elements, and as a result, the assembling of the faceplate is very complicated and costly.

Therefore, it is desired to design a faceplate which is capable of being assembled easily and inexpensively.

DETAILED DESCRIPTION OF THE PREFERRED EMBODIMENTS

Figure 1:
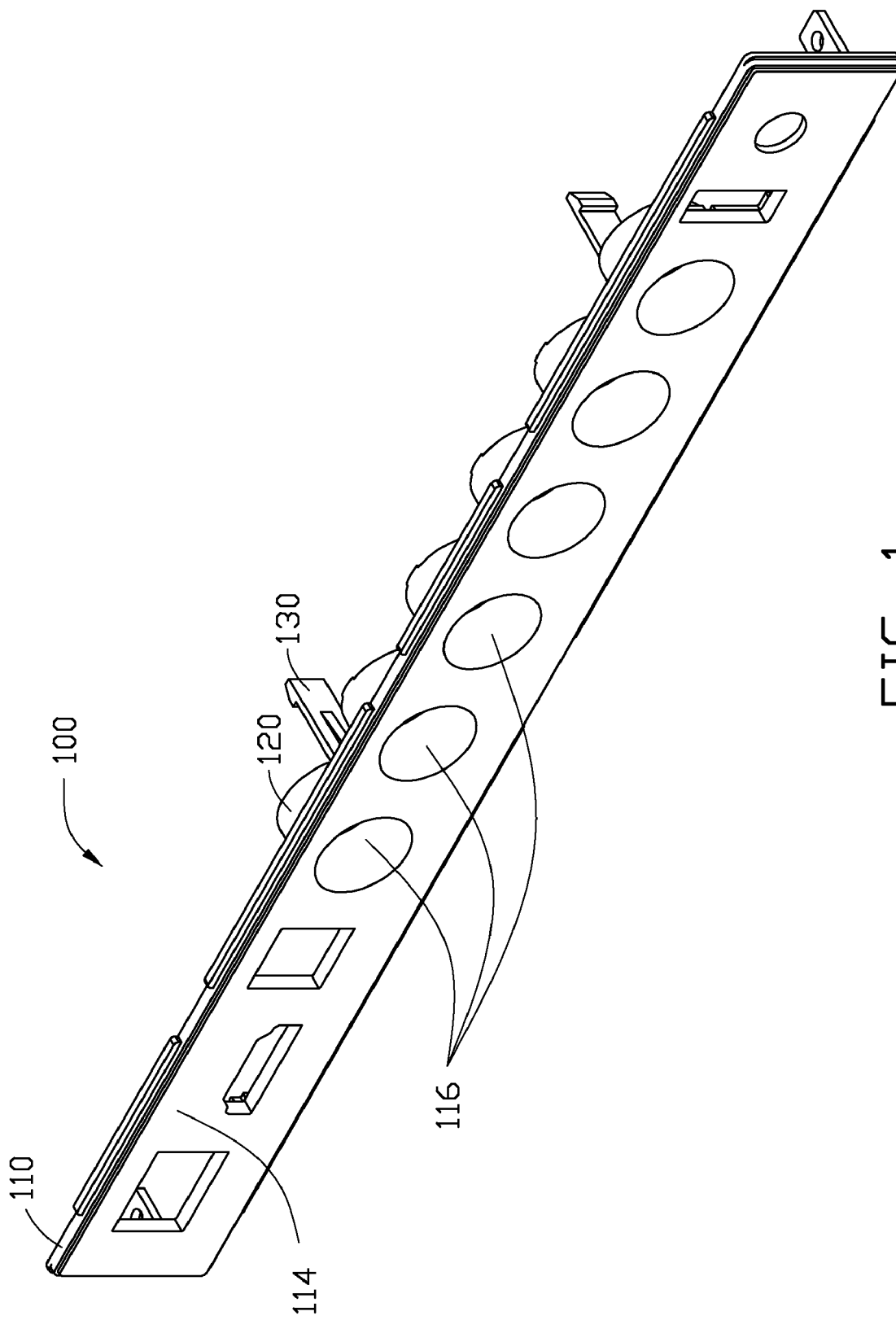
FIG. 1 is a schematic front view of a faceplate according to a first exemplary embodiment.
Figure 2:
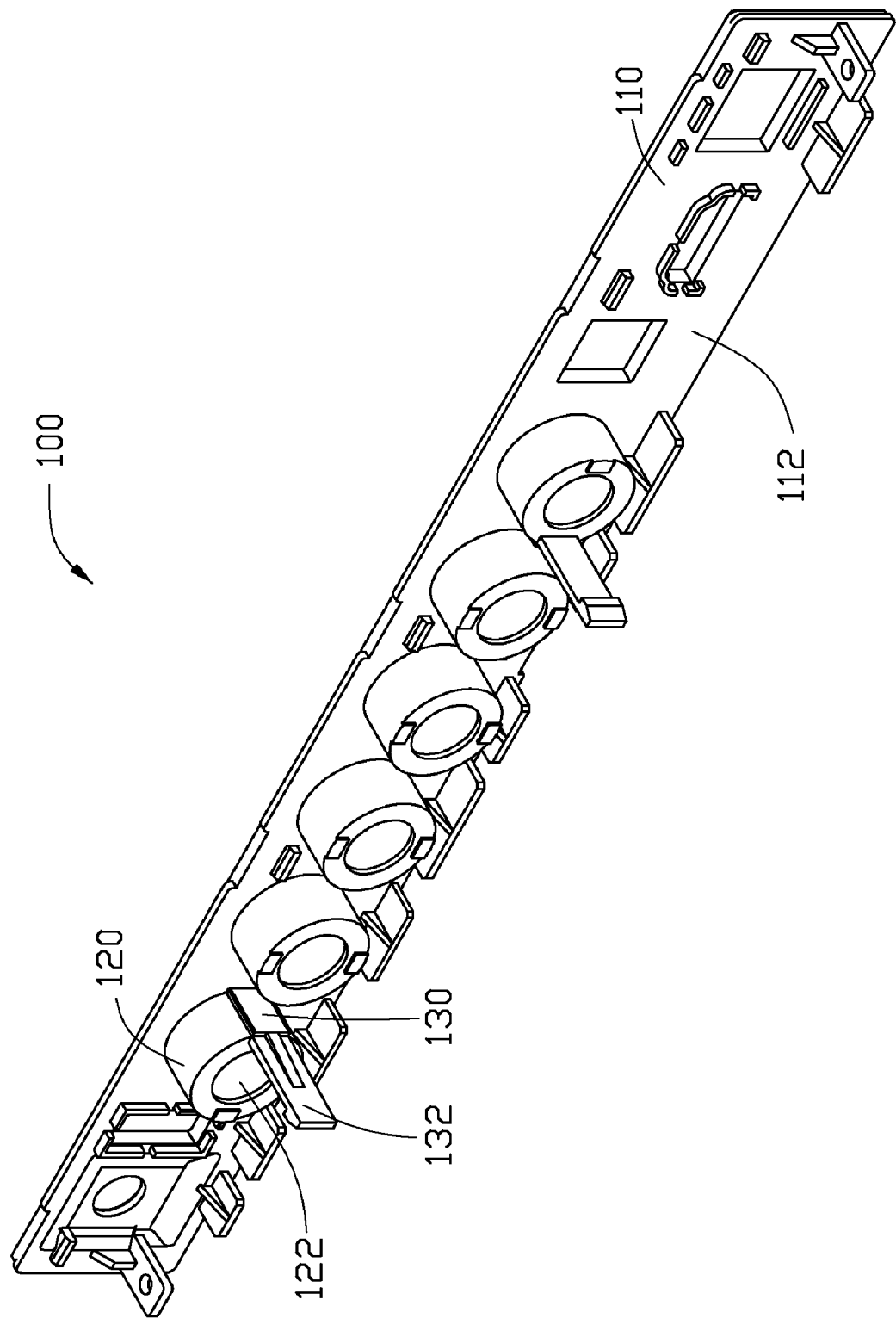
FIG. 2 is a schematic back view of the faceplate as shown in FIG. 1.

Referring to FIGS. 1 and 2, a faceplate 100 according to a first exemplary embodiment includes a panel 110, at least one guiding ring 120 and at least two hooks 130 attached on a surface of the panel 110.

The panel 110 includes an inner surface 112 and an opposite outer surface 114. A number of passageways 116 are defined on the panel 110 running through the inner surface 112 and outer surfaces 114 of the panel 110. The panel 110 may be made from plastic or metal.

The at least one guiding ring 120 is mounted on the inner surface 112 of the panel 110 around a corresponding passageway 116. In this embodiment, the faceplate 100 includes a number of guiding rings 120 according to the passageways 116. Each guiding ring 120 defines a housing room 122 that is aligned with and communicates with the corresponding passageway 116. The housing rooms 122 of the guiding rings 120 and the passageways 116 of the panel 110 are cooperatively configured for locating the faceplate 100 on a number of corresponding connectors with those connectors extending from the passageways 116. The guiding ring 120 may be made from plastic or metal which is same with the material of the panel 110 and can be integrated with the panel 110.

In this embodiment, the faceplate 100 includes two hooks 130 formed thereon which is configured for symmetrically fastening the faceplate 100 and maintaining balance of the faceplate 100. The hooks 130 are separately mounted on the inner surface 112 of the panel 110 and each one of the hooks 130 is adjacent to a guiding ring 120. Each hook 130 includes a clasp 132 formed on an end thereof, and the clasp 132 protrudes beyond the guiding ring 120. Understandably, if there is only one guiding ring 120 mounted on the inner surface 112 of the panel 110, the two hooks 130 are symmetrically distributed on the inner surface 112 and adjacent to the guiding ring 120 with the two clasps 132 protruding toward each other from the ends of the hooks 130. If there are more than one guiding rings 120 mounted on the inner surface 112 of the panel 110, the two hooks 130 may be symmetrically distributed on the inner surface 112 of the panel 110 and respectively adjacent to two separated guiding rings 120, with the clasps 132 of those hooks 130 being towards to a same direction or towards to two opposite direction respectively. The hooks 130 are made from an elastic material, and the height of each hook 130 with respect to the inner surface 112 is higher than that of the guiding ring 120 and is flexible with respect to the adjacent guiding ring 120. This flexibility allows the hooks 130 to bend outwards and snap and firmly hold any connectors inserted into the corresponding guiding ring 120, thereby mounting the faceplate 100 onto the electronic device. The hooks 130 may be made of plastic or metal which is same with the material of the panel 110 and can be integrally formed with the panel 110.

In present invention, the faceplate 100 employs the guiding rings 120 and the hooks 130 formed on the panel 110 to position and fix the faceplate 100, to the electronic device, instead of by screws, therefore the process of assembly of the connector protecting cover 110 is easy and cheap.

Figure 3:
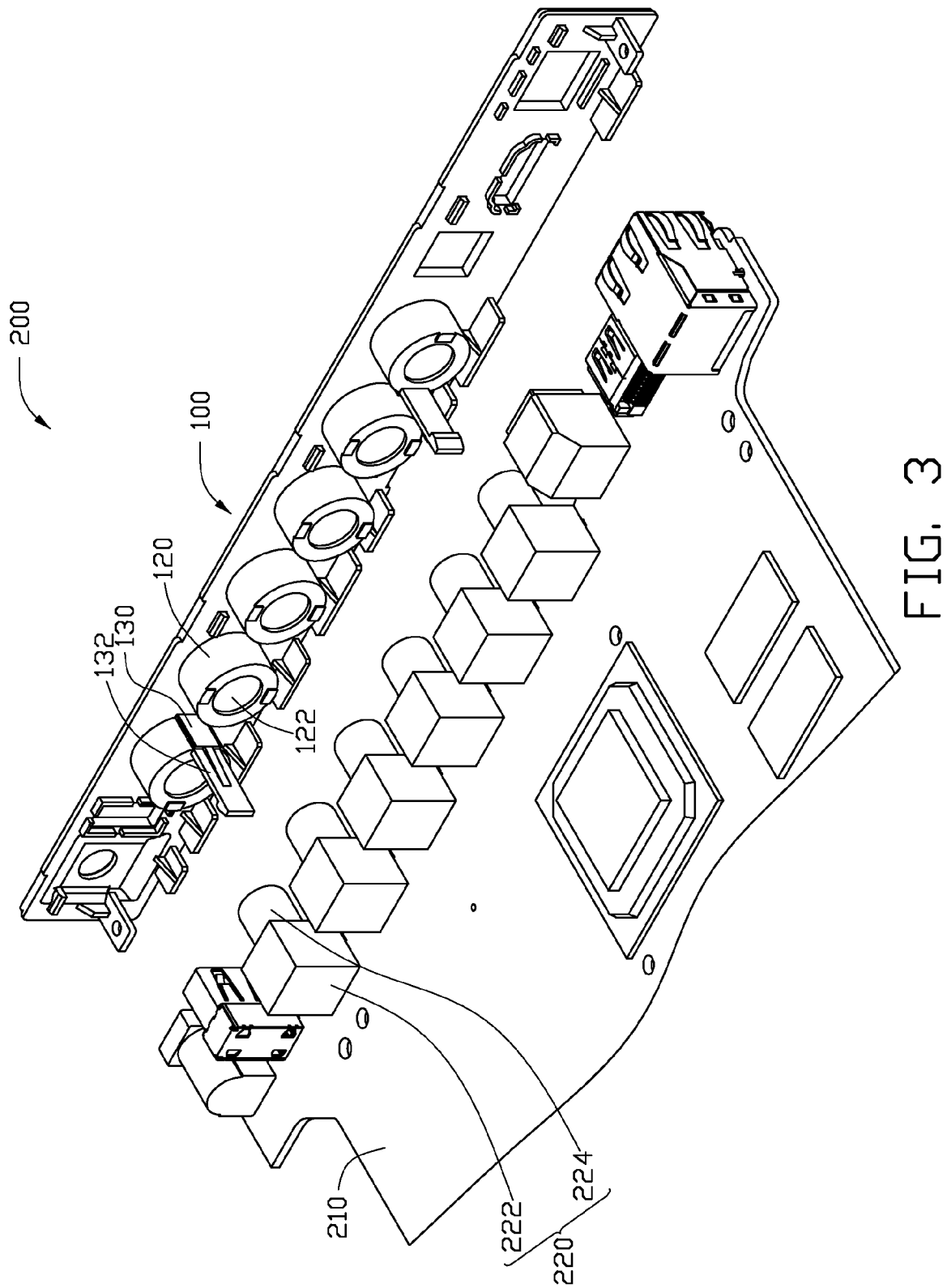
FIG. 3 is a schematic exploded view of an electronic device using the faceplate as shown in FIG. 1 according to a second exemplary embodiment.
Figure 4:
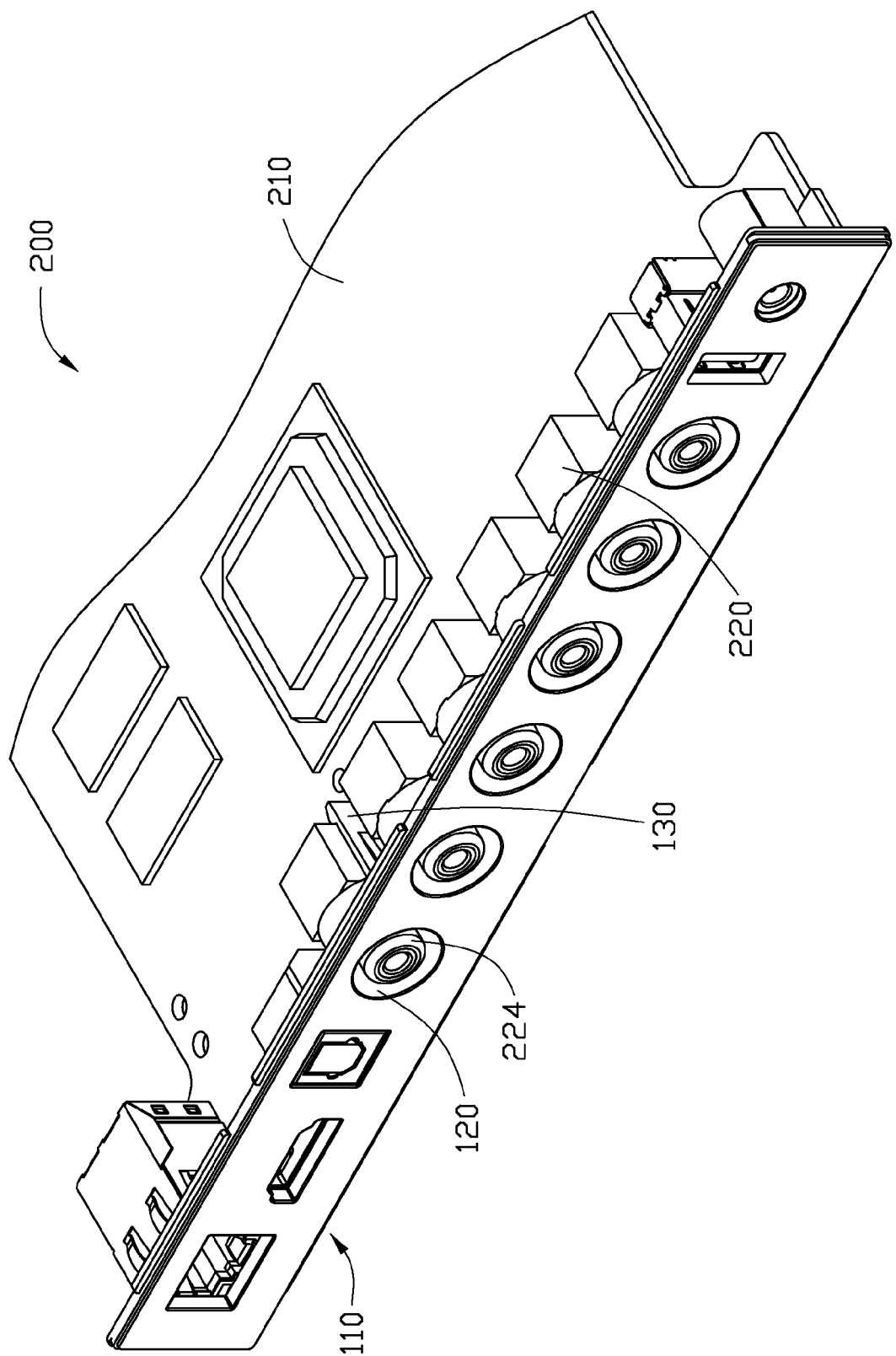
FIG. 4 is a schematic front assembled view of the electronic device of FIG. 3.
Figure 5:
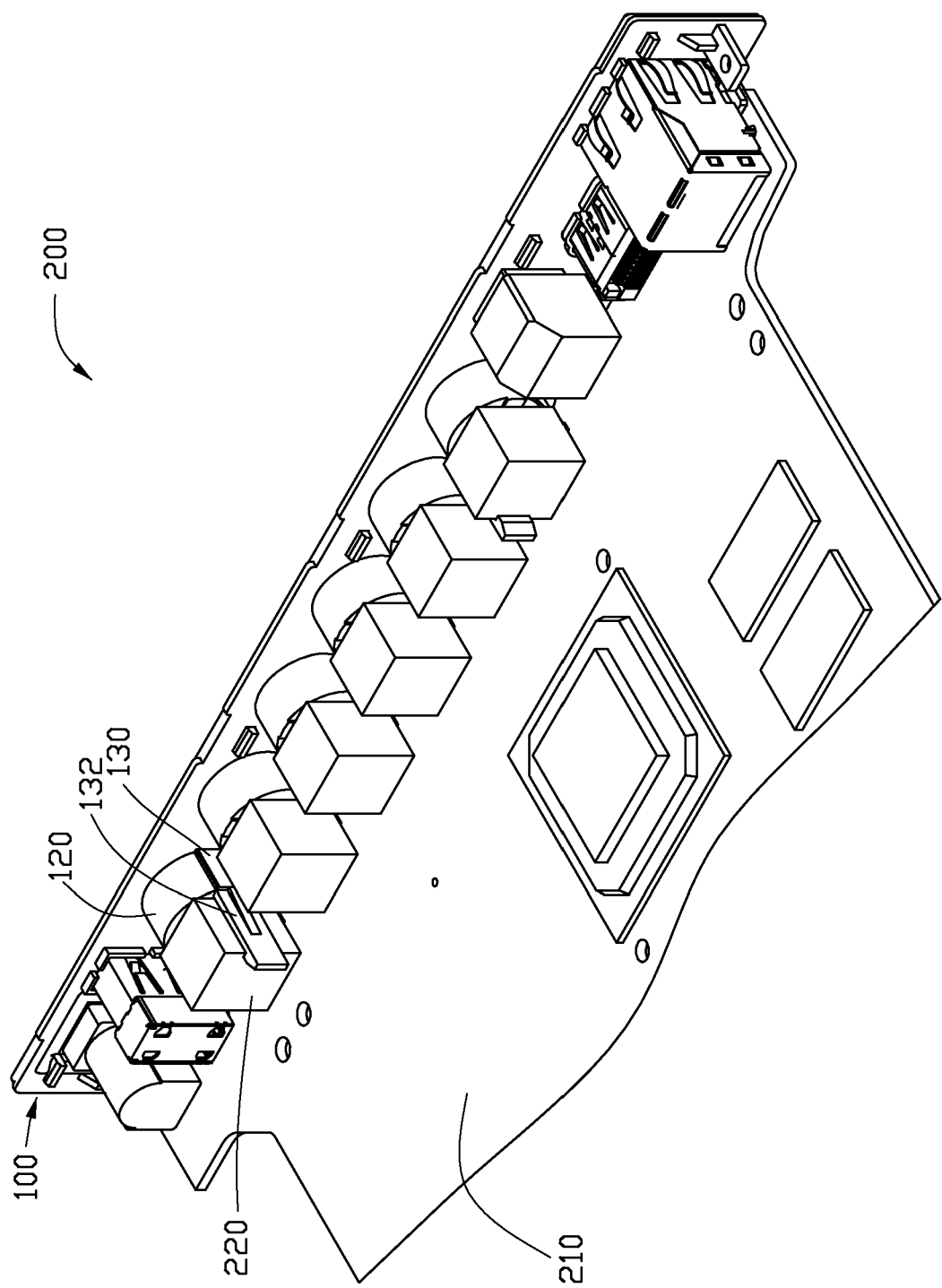
FIG. 5 is a schematic back assembled view of the electronic device of FIG. 3.

Referring to FIGS. 3 through 5, an electronic device 200, using the faceplate 100 mentioned above according to a second exemplary embodiment, includes a main board 210, a number of first connectors 220 separately mounted on one edge of the main board 210. Each first connector 220 includes a housing 222 and a pin 224 partially received in the housing 222.

To position and fix the faceplate 100 to the electronic device 200, the pins 224 of the first connectors 220, of the main board 210, are aligned correspondingly with the housing rooms 122 of the guiding rings 120 of the panel 110. The end of each pin 224 is inserted into the passageways 116 of the panel 110. The clasps 132 of the hooks 130 fasten on one or more housing 222 of the connectors 220. Thus, the faceplate 100 is fastened to the connectors 220 and the main board 210.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A faceplate for use in an electronic device, the electronic device comprising a main board comprising at least one connector mounted on one edge thereof, each of the at least one connector comprising a housing and a pin with one end received in the housing, the faceplate comprising:

a panel including an inner surface and an opposite outer surface, on which a number of passageways is defined running through the inner and outer surface;

a guiding ring mounted on the inner surface of the panel around a corresponding passageway of the panel, the guiding ring defining a housing room therein that is aligned with and communicates with the corresponding passageway of the panel; and two hooks separately mounted on the inner surface of the panel and being respectively adjacent to the guiding ring, each hook including a clasp formed on an end thereof and the clasp protruding beyond the guiding ring, the height of the each hook with respect to the inner surface of the panel being higher than that of the adjacent guiding ring with respect to the inner surface, wherein each of the two hooks engages an end of the housing of each of the at least one connector, which connects the panel to the main board.

2. The faceplate as claimed in claim 1, wherein the faceplate comprises one guiding ring, and the two hooks are symmetrically distributed on the inner surface and adjacent to the guiding ring with the two clasps facing each other.

3. The faceplate as claimed in claim 1, wherein the faceplate comprises a number of guiding rings, the two hooks are symmetrically distributed on the inner surface of the panel and adjacent to two separated guiding rings.

4. The faceplate as claimed in claim 3, wherein clasps of the two hooks are facing a same direction.

5. The faceplate as claimed in claim 3, wherein clasps of the two hooks are facing opposite directions.

6. The faceplate as claimed in claim 1, wherein the hooks are made from an elastic material.

7. The faceplate as claimed in claim 1, wherein the panel is made from a material selected from plastic and metal.

8. The faceplate as claimed in claim 7, wherein the guiding ring is made from a material selected from plastic and metal.

9. The faceplate as claimed in claim 8, wherein the guiding ring is integrated with the panel.

10. The faceplate as claimed in claim 8, wherein the hooks are made from a material selected from plastic and metal.

11. The faceplate as claimed in claim 10, wherein the guiding ring, and the hooks are integrated with the panel.

12. An electronic device comprising:
a main board;
at least one connector mounted on one edge of the main board, and each of the at least one connector comprising a housing and a pin with one end received in the housing; and
a faceplate including:
a panel including an inner surface and an opposite outer surface, on which a number of passageways is defined running through the inner and outer surface;
a guiding ring mounted on the inner surface of the panel around a corresponding passageway of the panel, the guiding ring defining a housing room therein that is aligned with and communicates with the corresponding passageway of the panel; and
two hooks separately mounted on the inner surface of the panel and being respectively adjacent to the guiding ring, each hook including a clasp formed on an end thereof and the clasp protruding beyond the guiding ring, the height of the each hook with respect to the inner surface of the panel being higher than that of the adjacent guiding ring with respect to the inner surface, wherein each of the two hooks engages an end of the housing of each of the at least one connector, which connects the panel to the main board.

* * * * *